Nov. 4, 1958

M. MENNESSON 2,858,674

HYDRAULIC COUPLING DEVICES

Filed Jan. 18, 1954

2 Sheets-Sheet 1

INVENTOR:
MARCEL MENNESSON
BY
Bailey, Stephens & Huettig
ATTORNEYS

United States Patent Office 2,858,674
Patented Nov. 4, 1958

2,858,674

HYDRAULIC COUPLING DEVICES

Marcel Mennesson, Neuilly-sur-Seine, France, assignor to Societe d'Appareils de Controle et d'Equipement des Moteurs S. A. C. E. M., Neuilly-sur-Seine, France, a society of France Application January 18, 1954, Serial No. 404,555

Claims priority, application France January 29, 1953

1 Claim. (Cl. 60—54)

The present invention relates to hydraulic couplings including a wheel rigid with one of two shafts (to wit a driving shaft and a driven shaft) to be interconnected, said wheel forming a rotor which cooperates with another rotor keyed on the other shaft.

The object of my invention is to provide a hydraulic coupling of this kind which is better adapted to meet the requirements of practice than those used up to the present time.

According to my invention, such a coupling is provided, at the place where the shaft rigid with one of said rotors passes through a casing in which the liquid is contained, with packing means to prevent leakages of this liquid, said means being tightly held by an elastic system but tending to be loosened under the effect of the centrifugal force acting upon the liquid contained in the casing, whereby a fluidtight packing is obtained when the coupling is at rest, whereas the packing means are loosened as soon as the coupling is rotating at a predetermined minimum speed.

Figure 1:
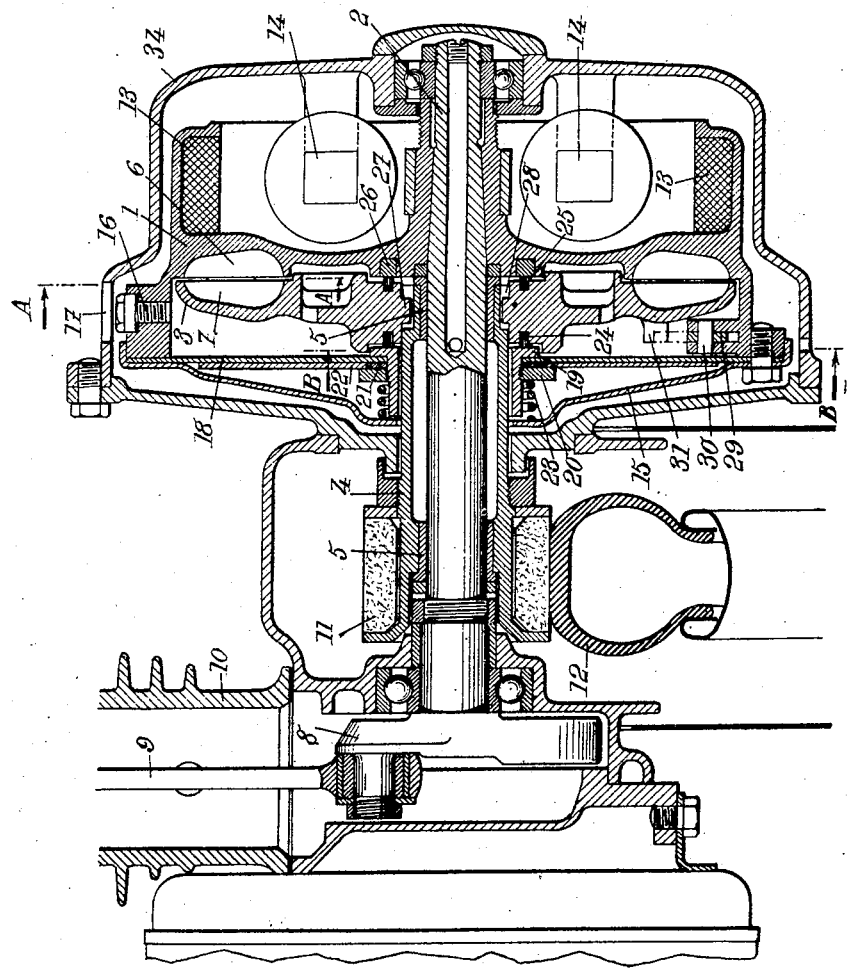

Preferred embodiments of my invention will be hereinafter described with reference to the accompanying drawings, given merely by way of example, and in which:

Fig. 1 diagrammatically shows in axial section a hydraulic coupling made according to my invention.

Figure 2:
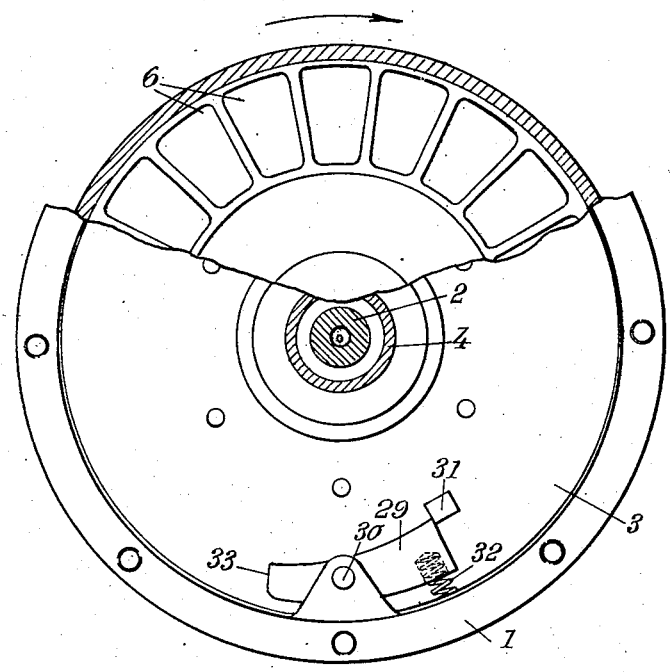

Fig. 2 is a view of the same coupling, partly in section on the line A—A and partly on the line B—B of Fig. 1.

As it is well known, the advantage of hydraulic couplings driven by the centrifugal force of a liquid is to achieve transmission between the engine and the receiver of the driving torque, while permitting a slipping of the receiver with respect to the engine, which makes it possible to stop the receiver and therefore, in the case of it is a vehicle, to have the engine running while the vehicle is stopped.

This advantage is particularly great in the case of bicycles in which it is of interest to have as few controls as possible to operate the vehicle, a hydraulic coupling requiring no particular control means.

Such a hydraulic coupling is essentially constituted by a wheel rigid with one of the shafts (either the driving one or the driven one), this wheel being provided at its periphery with recesses cooperating with other recesses that face them and are provided in a disc rigid with the other shaft. Advantageously, this last mentioned disc constitutes one of the end faces of a casing which surrounds the wheel, the shaft of said wheel thus extending through one of the walls of said casing.

A considerable difficulty that is encountered in most hydraulic couplings is to obtain a satisfactory packing between said shaft and the casing so as to avoid any leakage of the driving liquid either in operation or when the vehicle is stopped.

In order to obviate this difficulty, according to my invention, the coupling includes at the place where the shaft rigid with said wheel passes through one of the walls of said casing, packing means which are subjected to the action of an elastic system which tightens said means, the whole being arranged in such manner that under the effect of the centrifugal force exerted by the liquid contained in the casing, said tightening means tend to be brought out of action when the engine is running a speed over a predetermined value. Thus, said packing means are made tight when the vehicle is stopped, whereas the tightening action exerted thereon, together with the friction it involves, are eliminated as soon as the speed of revolution of the shaft reaches a predetermined value, the packing means then becoming practically unnecessary since the liquid tends to be driven away from said means under the effect of the centrifugal force.

Advantageously, according to my invention, I make use of a wheel and a disc which are movable axially with respect to each other, the disc and the shafts being for instance fixed axially and the wheel being slidable longitudinally with respect to its shaft. On the other hand, one of the end walls of the casing is at least partly flexible and is urged by suitable elastic means toward the other wall which faces it. Below a predetermined speed of the engine, the flexible wall is pressed against the wheel and said wheel is in turn pressed against the disc, the contact between the flexible wall and the wheel and between the wheel and the disc taking place through packing rings or analogous parts. When the speed exceeds this value, the action of the centrifugal force to which the liquid is subjected becomes preponderating over the elastic return means which acts upon the flexible wall and this flexible wall is thus moved slightly away from the wheel, contact between the respective parts in movement of the flexible wall, the wheel and the disc being thus done away with.

I will now specifically describe the embodiment of my invention illustrated by the drawings.

The driving portion of the coupling is constituted by a disc 1 which forms one of the end walls of the casing and is keyed upon shaft 2. The receiver or driven portion is constituted by a wheel or turbine 3 rigid with hollow shaft 4 which is coaxial to shaft 2. Rolling means 5 or equivalent bearing means are interposed between shafts 2 and 4 so as to reduce friction to a minimum. The disc and the wheel are provided with blades or recesses 6 and 7 facing each other and are adapted to cooperate with each other through the intermediary of the liquid contained in the casing. Shaft 2 may be constituted by the end of the crank shaft 8 of the engine. 9 is the connecting rod of this engine and 10 the end of the cylinder thereof. In the construction shown by the drawing, the engine drives the vehicle through the hydraulic coupling by means of a roller 11 keyed on hollow shaft 4 and in contact with the tire 12 of one of the wheels of the vehicle. Of course, such an arrangement is given merely by way of example.

Advantageously, and as shown by the drawing, supposing that the engine is provided with an ignition device including a magnetic fly-wheel, the driving disc 1 of the coupling and the magnetic fly-wheel are constituted by the same piece, which makes it possible to reduce the weight and the volume of the coupling. I have diagrammatically shown at 13 and 14 the inductors and the armatures of the magnetic fly-wheel.

If the casing of the coupling were closed by a rigid plate such as 15 fixed on the disc, leakages of liquid might take place where the hollow shaft 4 passes through said rigid plate 15, since the casing is filled with a liquid such as oil, which occupies most of the volume of said casing. I have shown at 16 the plug of a filling hole provided in disc 1 and which, when placed opposite an aperture 17 of the envelope 34 which contains the coupling, makes it possible to fill the casing with oil.

In order to eliminate such leakages, the casing is closed not by rigid plate 15 but by a slidable end wall urged by a spring which tends to apply it against wheel 3, and this wheel is made movable axially with respect to its shaft 4 so that it can in turn be pushed against disc 1, the mutual contact surfaces being arranged in such manner as to ensure a fluidtight packing.

For instance, said slidable end wall is constituted by an annular disc 22 combined with a diaphragm 18, for instance of synthetic rubber, not attacked by oil, these elements 18 and 22 being caught between a sleeve 19 freely movable on shaft 4 and a nut 20, with the interposition of a ring 21. On the other hand, the outer edge of diaphragm 18 is caught between disc 1 and rigid plate 15. Diaphragm 18, rigid annular disc 22 and nut 20 can push sleeve 19 (toward the left, on Fig. 1) against the action of a spring 23 disposed between nut 20 and plate 15 rigid with disc 1. The packing means provided on the contacting surfaces of sleeve 19, wheel 3 and disc 1 are constituted by plastic rings 24 and 25 carried by said wheel 3 and adapted to rest upon the side face of sleeve 19 on the one hand and upon a friction ring 26 provided in disc 1 on the other hand. In order to enable wheel 3 to slide without rotating upon its shaft 4, it is provided for instance with fingers 27 engaged in grooves 28 formed in shaft 4.

This device works in the following manner. In the state of rest, when the casing is more or less completely filled with oil, spring 23 pushes sleeve 19 through nut 20 and applies plastic ring 24 on the side face of sleeve 19 and also pushes wheel 3 toward disc 1, which applies packing ring 25 against friction ring 26. Accordingly, a fluidtight packing ring is constituted which prevents oil from escaping from the inside of the coupling device.

When the engine starts running, the liquid contained in the casing is applied by the centrifugal force against the periphery of said casing. The center of the casing is empty of liquid and the packing means are no longer useful. The liquid penetrating into the portion which contains blades 6 and 7 causes turbine wheel 3 to be driven as well known in the case of hydraulic couplings.

During the starting period, a slipping takes place between turbine wheel 3 and disc 1, whereby packing rings 24 and 25, which are rigid with turbine 3, rub in a substantial fashion on the contact face of sleeve 19 and ring 26 rigid with disc 1.

As soon as the engine reaches a predetermined speed, this friction, which involves wear and tear, is eliminated by the device according to my invention. This is due to the fact that the liquid which is present on the periphery of the casing due to the action of the centrifugal force exerts on diaphragm 18 and disc 22 a thrust which increases quickly when the speed of revolution increases and which gradually overcomes the action of spring 23. Sleeve 19 is pushed away, which eliminates contact between packing members 24 and 25 and the cooperating surfaces carried by the fixed parts and thus eliminates friction due to these packing members. Of course, the system works in the reverse manner when the engine slows down below a predetermined speed.

I thus obtain a liquidtight hydraulic coupling which, during the operation of the engine, involves no friction other than that inherent in the operation of blades 6 and 7 which constitute the coupling.

In some cases, when the engine is started by means of the receiver or driven shaft 4, a hydraulic coupling does not easily permit the starting of the engine because at low speeds practically no force is transmitted by the liquid and these small values of the forces do not make it possible to start the engine. This is the case in particular of a light vehicle such as a bicycle fitted on auxiliary engine where starting is performed by the driver by means of the pedals or by pushing the vehicle.

In order to obviate this drawback, it is advantageous to make use of another feature of my invention.

According to this feature, which will be supposed to be applied to a hydraulic coupling such as above described, I provide a pawl system achieving an abutment connection in the direction of normal rotation of the mechanism, between the shaft which is normally the driven shaft and the shaft which is normally the driving shaft, whereby the engine can be started by means of the shaft which is normally the driven one.

This pawl system may be constituted by a pawl 29 pivotable about a spindle 30 carried by disc 1 and by an abutment 31 rigid with turbine wheel 3 and urged by a spring 32 toward said abutment. The pawl is arranged in such manner as to be retracted when disc 1 turns at a speed higher than that of turbine 3 (see in particular Fig. 2).

In order to start the engine, the roller 11 (or any other device for transmission from the engine to the vehicle) is acted upon in the direction of the arrow of Fig. 2. Shaft 4 and wheel 3 are then driven and through the pawl and the abutment, disc 1 and driving shaft 2 are given the same speed of revolution. When the engine is running by itself and its speed exceeds that of wheel 3 and consequently of roller 11, pawl 29 escapes from abutment 31 and the engine turns freely while driving turbine wheel 3 with a certain slipping. Advantageously, pawl 29 is arranged in such manner that it retracts automatically when the speed exceeds this value. For this purpose, the distribution of the masses of the pawl on either side of its pivot axis and also the strength of return spring 32 are calculated so that the centrifugal force to which the pawl is subjected causes it to swing out of the trajectory of the abutment when said speed is reached. Of course, spring 32 returns the pawl into this trajectory as soon as the engine stops.

It may be desired to provide the hydraulic coupling with a device for positively coupling, as already known, driving disc 1 (or its shaft) with driven wheel 3 (or its shaft) at high speeds so as to prevent any slipping between these two elements. In this case, I advantageously make use, for this purpose, of the same parts as those above described for starting the engine. For instance, pawl 29 is provided with a heel part 33 intended to come into contact with abutment 31 when the centrifugal force becomes sufficient to compress spring 32 to a sufficient degree, the characteristics of this spring being established so as to obtain engagement at a speed predetermined by the constructor.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claim.

What I claim is:

A hydraulic coupling which comprises, in combination, a driving shaft and a driven shaft coaxially surrounding each other, a rotor wheel fixed in rotation to said driving shaft, a turbine wheel fixed in rotation to said driven shaft opposite said rotor wheel, said two wheels being provided with respective sets of projections facing each other for hydraulic transmission, a casing partly filled with liquid, said casing being constituted by a plurality of elements, said elements being one of said wheels, an annular ring rigid with said one wheel and surrounding the outer periphery of the other wheel, an annular end wall slidably surrounding said two shafts on the other side of said other wheel from said one wheel, a resilient liquid-tight diaphragm carried by said annular ring and extending between it and said annular end wall, annular packing means between the hub portions of said two wheels, and annular packing means between the inner periphery of said annular end wall and the hub portion of said other wheel, said other wheel being slidable axially with respect to the shaft to which it is fixed in rotation, a plate rigid with said annular ring and extending toward said shafts on the other side of said annular end wall from said wheels, and resilient means between the inner periphery of said plate and the inner periphery of said annular end wall for urging said annular end wall toward said other wheel.

References Cited in the file of this patent

UNITED STATES PATENTS

| | | |
|---|---|---|
| 1,873,688 | Walker | Aug. 23, 1932 |
| 2,448,539 | Maurer | Sept. 7, 1948 |

FOREIGN PATENTS

| | | |
|---|---|---|
| 446,530 | Great Britain | Apr. 27, 1936 |